June 26, 1951 — R. A. FRYKLUND — 2,558,676

DISTANCE MEASURING SYSTEM

Original Filed May 21, 1947 — 3 Sheets—Sheet 1

INVENTOR
ROBERT A. FRYKLUND
BY
ATTORNEY

June 26, 1951  R. A. FRYKLUND  2,558,676
DISTANCE MEASURING SYSTEM
Original Filed May 21, 1947  3 Sheets—Sheet 2

INVENTOR
ROBERT A. FRYKLUND
BY
ATTORNEY

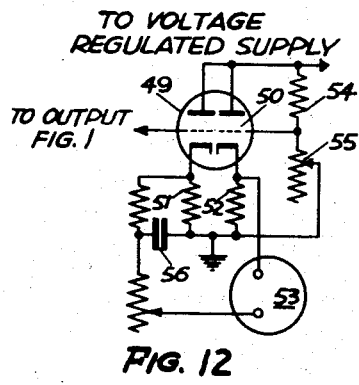
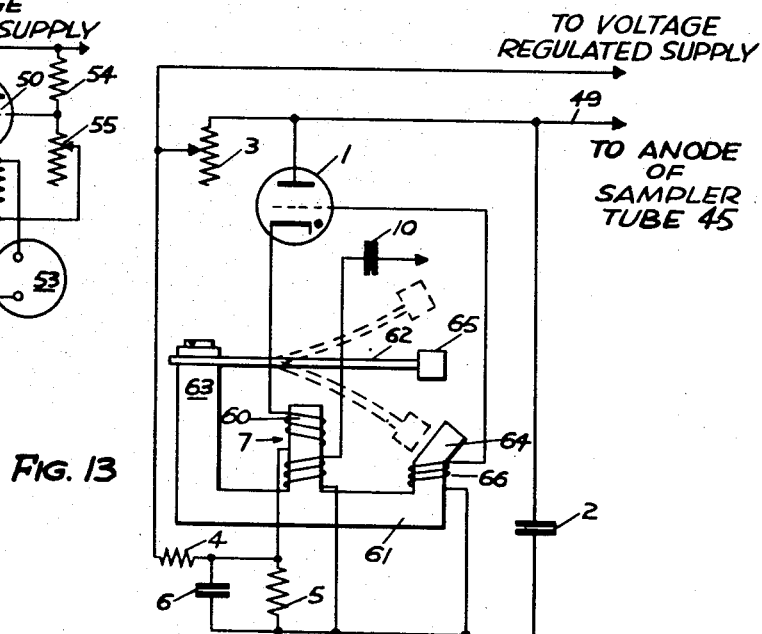
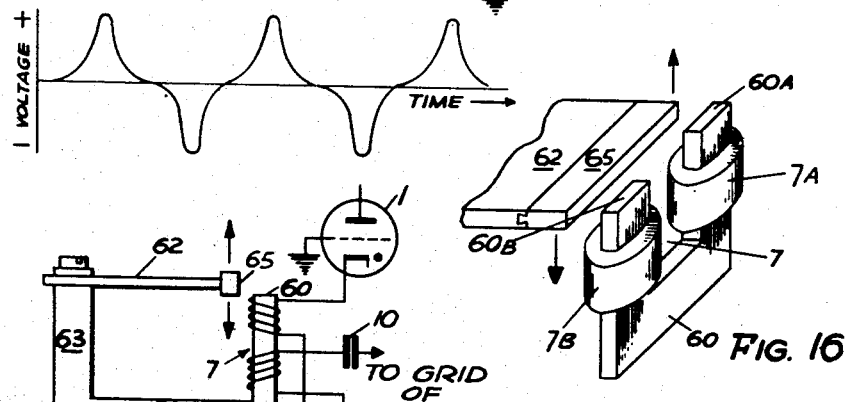
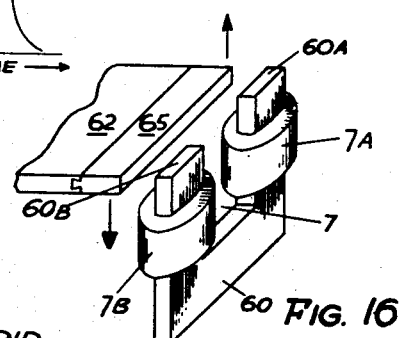

Patented June 26, 1951

2,558,676

UNITED STATES PATENT OFFICE 2,558,676

DISTANCE MEASURING SYSTEM

Robert A. Fryklund, Somerville, Mass., assignor to Raytheon Manufacturing Company, a corporation of Delaware Original application May 21, 1947, Serial No. 749,426. Divided and this application April 8, 1948, Serial No. 19,680

6 Claims. (Cl. 250—36)

The present application is a division of application Serial Number 749,426, filed May 21, 1947, and now Patent No. 2,502,938.

The present invention relates in general to apparatus for measuring the distance to a surface by the transmission of compressional wave energy toward the surface, and the reception of compressional wave energy reflected from the surface, and in particular to such apparatus as used for determining the depth of a body of water.

It is an object of the present invention to provide an improved apparatus for water depth sounding of the type wherein an ordinary electrical meter may be employed to indicate the depth.

It is another object to provide such an apparatus wherein a pulse which triggers the transmitted pulse of energy is employed to advantage to provide a zero standard for the meter, and which cannot provide a false depth, or zero reading, but always provides a reliable standard.

Additional objects of the invention are to provide such an apparatus wherein, if no echoes are received, the meter reading drops to zero or a minimum, and wherein the meter is maintained sensitive only to the first echo returned, and is rendered insensitive to any second, third, or other spurious echoes that may return.

Another object is to provide a reliable direct reading water depth measuring apparatus.

Still another object is to minimize the response of the indicating meter to spurious signals due to reverberations, mechanical "ringing" of the transducer, or "ringing" of the tuned circuit.

It is also an object of the invention to provide a depth indicator of the above-described kind which is relatively light in weight, compact, portable, and inexpensive, and can be operated for long periods of time from an ordinary low voltage battery.

The foregoing and other objects and features of the present invention will be best understood from the following description of a circuit embodying the invention particularly for the purpose of water depth measurement, reference being had to the accompanying drawings wherein:

Fig. 1 is a schematic representation of a circuit embodying the invention;

Figs. 2 to 11, inclusive, are graphs illustrating the operation of the circuit of Fig. 1;

Fig. 12 is a schematic representation of a vacuum tube voltmeter that may be used with the circuit of Fig. 1;

Fig. 13 is a schematic representation of a modification of the sweep generator shown in Fig. 1;

Fig. 14 is a graph illustrating the operation of the device shown in Fig. 13;

Fig. 15 is a schematic representation of another modification of the sweep generator; and Fig. 16 is a fractional view of a synchronizing pulse generator that may be used with the modification of Fig. 15.

Figure 1:
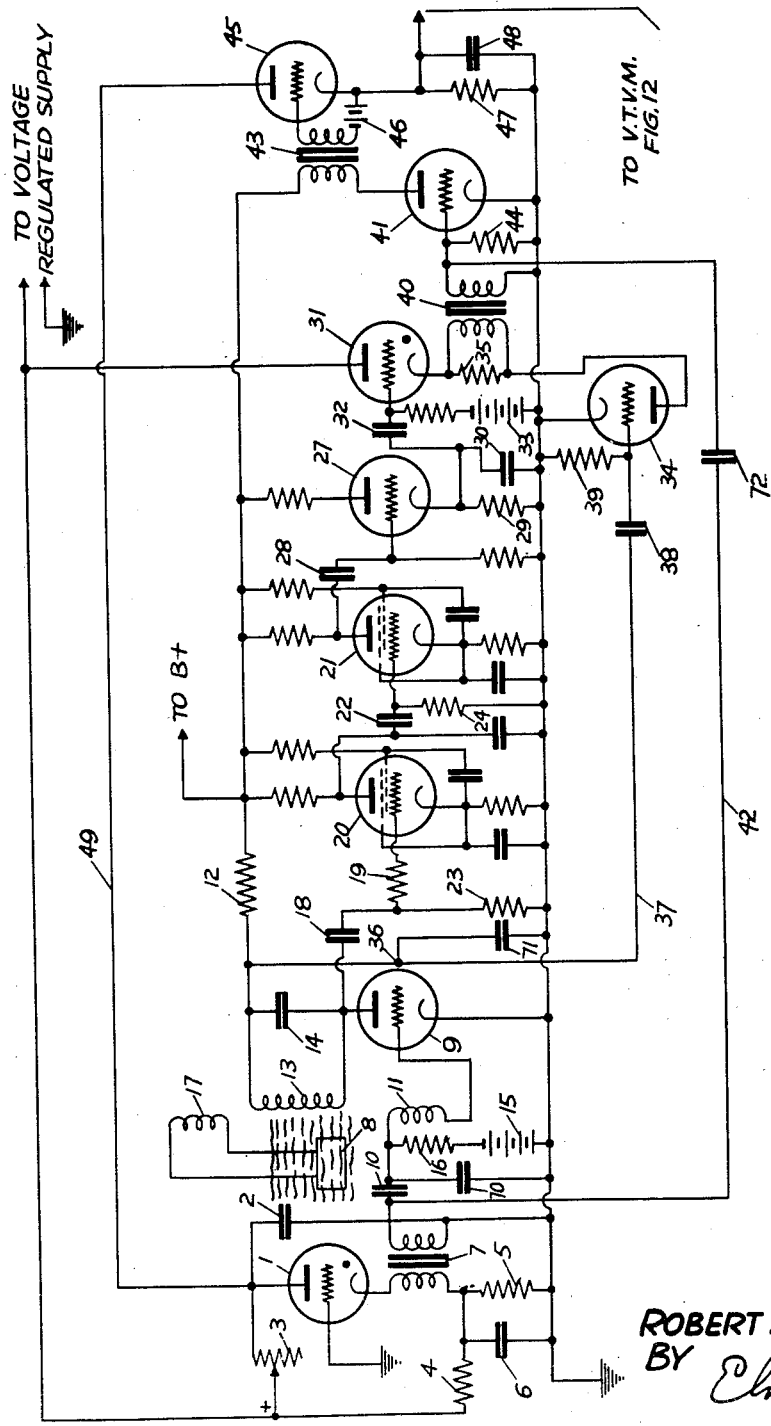
Figure 2:
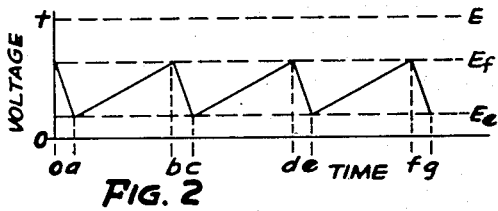

Referring now to Fig. 1, a gaseous discharge tube 1, for example a "Thyratron," and its associated circuit components comprise a saw-tooth wave generator. This tube and its circuit are used for many purposes: to provide a linear time base, to control the keying of a pulse generator, and to provide a "zero" standard for an indicating meter, as will be described below. A voltage regulated power supply (not shown) is preferably used to supply the plate voltage for the tube through a variable plate resistor 3. A condenser 2, the charging and discharging of which provides the saw-tooth voltage output, is connected from the plate of the gas tube 1 to ground. With the application of plate voltage to the gas tube 1, the condenser 2 is charged at a rate determined by the product of the resistance of the plate circuit resistor 3 and the capacitance of the condenser 2. The polarity of the charge is such that a positive charge is built up on the anode of the gas tube, to which the condenser is connected. In order to obtain a nearly linear charging curve, the grid bias of the gas tube 1 is so regulated that the tube fires before the condenser 2 is fully charged, and only a substantially linear portion of the charging curve is utilized. A voltage divider consisting of the resistors 4 and 5 connected from B+ to ground, to the junction of which the cathode of the gas tube is connected, determines the grid bias of the tube. A cathode by-pass capacitor 6 is connected across the cathode resistor 5. The value of the resistors 4 and 5 may be so chosen that the cathode has a predetermined positive potential with respect to the grid potential (the grid may be grounded as shown in Fig. 1), and this causes the tube to fire at the desired point on the charging curve of the condenser. For example, if the bias is adjusted so that the gaseous discharge tube 1 is fired by a plate voltage $E_f$ which is less than the highest voltage E available from the B+ supply, as represented in Fig. 2, a substantially linear saw-tooth pattern is obtained. The upward sloping portion C (from line $a$ to line $b$) of this voltage pattern, appearing on the plate of the tube 1, is used in the circuit as a time base in a manner which will be described below. The lowest voltage $E_e$ shown in Fig. 2 is the extinction voltage of the tube with this bias condition.

In Fig. 2, time is represented along a horizontal axis, the start of a time base sweep C occurring at $a$, $c$, and $e$, and ending at $b$, $d$, and $f$, respectively, while return voltage D occurs between times $b$ and $c$, $d$ and $e$, and $f$ and $g$. The entire sawtooth voltage wave consists of time base sweeps C and return voltages D occurring alternately. In Figs. 2 to 11, inclusive, the various waves that are illustrated are related to each other in time by these points $a$, $b$, $c$, $d$, $e$, $f$, and $g$, which are deemed to be sufficient in number to illustrate the time relationship of the waves. Voltage or current is represented in all cases along the vertical axis.

Figure 3:
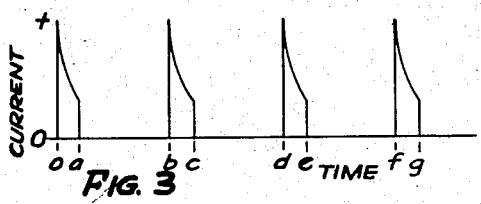
Figure 4:
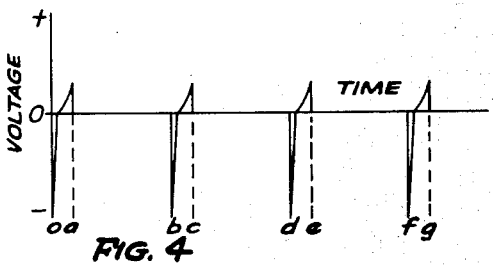

A transformer 7 is connected with its primary winding in series in the cathode circuit of the gas tube 1. This transformer has low inductance in its primary coil circuit and is designed so that its core will not saturate, as used in the sawtooth generator circuit. It performs the function of a differentiating transformer as follows. During the time ($a$ to $b$ in Fig. 2) the condenser 2 is charging and the tube 1 is cut off, no current flows in the gas tube 1, and hence through the primary winding of the transformer 7. However, during the time the tube is conducting ($b$ to $c$ in Fig. 2), while the condenser 2 is being discharged, there is a surge of current through the tube, and consequently through the primary winding of the transformer, the approximate wave form of which is shown in Fig. 3. The transformer 7 then produces negative and positive pips in its secondary winding, having a well-known form generally as shown in Fig. 4. The transformer is so connected to the tube 9 that follows that a positive pip is produced at the end of every discharge of the condenser 2, or, in other words, at the beginning of every charging period of the condenser 2. This positive pip is used to control the tube 9, which is in a blocking oscillator circuit, and in turn causes a pulse of compressional wave energy to be projected by a transducer 8 at the instant the condenser 2 starts to charge, that is, at the beginning of each time base sweep C. The time taken for the condenser 2 to discharge, namely time $b$ to $c$, $d$ to $e$, or $f$ to $g$, is employed to advantage to provide the positive pips shown in Fig. 4 at the beginning of the time bases C, rather than at the ends thereof. As will be seen, this provides for a reliable stable "zero" standard for the indicating meter.

Figure 5:
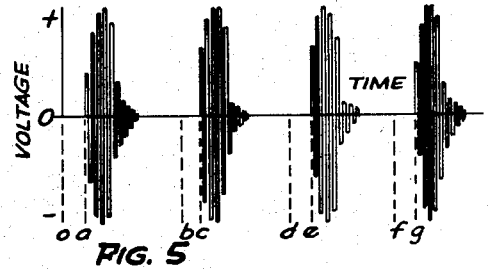

The output of the differentiating transformer 7, consisting of the negative and positive pips of Fig. 4, is impressed on the control grid of the electron discharge tube 9 through a coupling condenser 10 and an inductance 11 connected together in series. Plate voltage is supplied to the tube 9 through a plate resistor 12, and a tuned circuit comprising an inductance 13 and a capacitance 14 connected together in parallel. This circuit may be tuned to any desired frequency, for example 45 kilocycles. The coil 13 is coupled to the inductance 11 in the grid circuit of the tube, providing plate-to-grid feedback which establishes oscillation at the frequency of the tuned circuit. The blocking oscillator circuit is normally biased to cut-off by the grid bias battery 15. However, whenever a positive pip from the transformer 7 is impressed on the grid of the tube 9, oscillation is initiated. The tube then continues to oscillate until it is blocked by the voltage built up on the coupling condenser 10 by the flow of current through the grid resistor 16. By suitably choosing the values of the coupling condenser 10 and the grid resistor 16, the time required for the oscillator to block may be adjusted so that the oscillator produces a short (for example about ¾ millisecond) pulse of oscillating voltage for each positive pip that appears on the control grid of the tube 9, as shown in Fig. 5. An additional condenser 70 may be connected across the battery 15 and grid resistor 16 for the purpose of lengthening the oscillation period. The oscillating electric pulses are transformed to compressional wave energy by the transducer 8 which is coupled to the tuned circuit inductance 13 by another inductance 17.

It will be noted that the operation of the system just described is such that substantially at the instant the condenser 2 of the saw-tooth wave generator 1 has just begun to recharge, a pulse of oscillating energy is produced by the blocking oscillator, which pulse is propagated into space as compressional wave energy by the transducer 8. Simultaneously, the same oscillator pulse, which will be called a "direct pulse," is also transmitted to the subsequent amplifier stages 20 and 21 through a coupling condenser 18. Compressional waves received by the transducer 8, due to reflection of the transmitted pulses of compressional wave energy from an object in their path, are converted to electrical energy by the transducer 8 and coupled into the amplifier circuit through the tuned circuit inductance 13. This energy will be called the "reflected pulses," and passes through the amplifier coupling condenser 18 to the amplifier stages just as the "direct pulses" do. The same tuned circuit is used for both the transmit and receive functions.

Two stages of amplification 20 and 21 are employed in Fig. 1. The tubes used may be 6SJ7 or any other suitable type. The first coupling resistor 19 is a limiting resistor to prevent overloading the first tube 20 on strong direct signals. Both amplifier tubes are operated as time varied gain amplifiers. When a strong signal is impressed on the control grids of these tubes, such as the direct pulse, the tubes draw sufficient grid current to charge the coupling condensers 18 and 22, the polarity of the charge being such that a negative charge appears on the respective grids, which reduces the gain of the amplifiers. This self-induced grid bias is then permitted to leak off through grid leak resistors 23 and 24, respectively, so that in a desired interval of time the amplifiers have regained full sensitivity. The purpose of this is to decrease the sensitivity of the amplifiers directly after a direct pulse is impressed on them so that they will be insensitive to the "hash" following a direct pulse. This hash results from mechanical "ringing" of the transducer 8 after a pulse has been transmitted and is due also to the energy that is stored in the tuned circuit 13 and 14 of the oscillator. As will be understood later, the presence of this "hash" after the direct signal must be compensated for to prevent spurious readings in the meter. Using two stages of time varied gain has this effect since the gain of the amplifiers is so decreased directly after a direct pulse that the circuit is rendered insensitive to the "hash," while sufficient amplifier sensitivity is retained to amplify echoes that may be received. The use of a single tuned circuit, the inductor 13 and capacitor 14, for both the transmit and receive function is thus made feasible.

The resistance-capacitance values of the resistor-condenser combinations 18, 23 and 22, 24, which determine the time required for the amplifiers 20 and 21 to regain full sensitivity after a strong signal has been impressed on them, are so chosen that the amplifiers are not rendered insensitive to the reflected pulses. The strength of the reflected pulses picked up by the transducer 8 is inversely proportional to the square of the distance to the reflecting surface; the shorter the distance, the stronger the reflected pulse and the greater the distance, the weaker the reflected pulse. Consequently any reflected pulse received in a depth of water so shallow that it is impressed on the amplifier during the time "hash" from a direct signal still appears therein will have a strength considerably greater than the "hash." Therefore by the proper choice of circuit constants, the time varied gain effect is made such that the amplifiers will be insensitive to "hash" but will be sensitive to any reflected pulses picked up while "hash" is still existent. Furthermore, the circuit is made such that the amplifier sensitivity is restored at a rate greater than the rate at which the reflected signal strength decreases.

Figure 6:
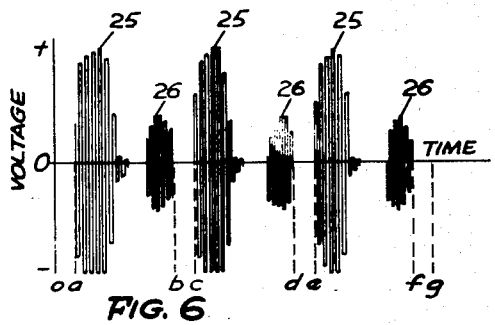

The amplified signals produced on the plate of the second amplifier tube 21 are represented in Fig. 6. The direct signals are usually so strong that either or both amplifier stages may overload, resulting in the clipped or limited form 25 shown. Due to the effect of the time varied gain, the "hash" of Fig. 5 has been virtually eliminated. It may also be observed that another effect of the time varied gain is to cause the echoes 26 from whatever distance received to have a more constant value.

Figure 7:
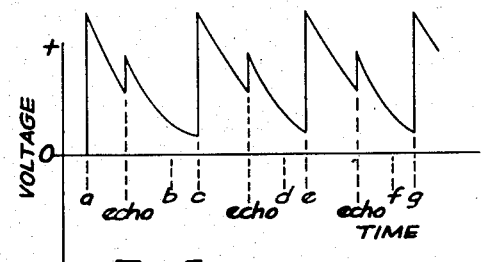

The signals represented by Fig. 6 are impressed on the grid of a detector tube 27 through a coupling condenser 28. The detector tube 27 is operated preferably as an infinite impedance detector, and the cathode resistor 29 is accordingly sufficiently large so that the tube is self-biased nearly to plate current cut-off. The cathode by-pass condenser 30 and the resistor 29 together in the cathode circuit of the detector comprise a resistance-capacitance filter which further filters out "hash" that may remain after the direct signal. The resistor 29 may for this purpose have a value of, for example, 150,000 ohms, and the capacitor a value of 0.02 microfarad. The detector tube 27 being a rectifier, only the positive voltage portion of the signals shown in Fig. 6 is effective. The capacitor 30 being small, it is quickly charged to the full available voltage when the pulses 25 and 26 are applied, and then discharges slowly through the resistor 29, so that the voltage wave of the output of the detector tube 27 is as shown in Fig. 7. The slow discharge of the capacitor 30 renders the detector output insensitive to any remaining "hash" after the direct signal, but the discharge is fast enough so that an echo is detected. The sharp rise of the echo pulse is used to control the stages that follow, as will be explained, and it is desirable that the first sharp rise after a direct pulse be that of the first echo.

The output of the detector is impressed on the grid of a gaseous discharge tube 31, which may be a "Thyratron," through a coupling condenser 32. This tube 31 is normally biased just below the firing point, as by a battery 33. The cathode is connected to ground through a cathode resistor 35 and a switch tube 34, which may be a high vacuum triode.

A sufficiently high plate voltage is supplied to the switch tube 34 through the gas tube 31 and the cathode resistor 35 to render the switch tube 34 conductive whenever the gas tube 31 is fired and the switch tube has no grid bias. On the other hand, when a negative bias voltage appears on the grid of the switch tube 34, this tube is rendered non-conductive and either cuts off the gas tube 31, if that tube is at the time conducting, or prevents it from firing if a positive pulse is simultaneously applied to the grid of the gas tube. Consequently the gas tube 31 is fired whenever there is no negative bias voltage on the grid of the switch tube 34 and the grid of the gas tube 31 is supplied with a positive pulse from the detector 27.

The grid potential of the switch tube 34 is controlled by the potential existing at a point 36 which is effectively between the plate resistor 12 and the anode of the oscillator tube 9, and this potential is applied to the grid of the switch tube 34 through a suitable conductor 37 and a coupling condenser 38. It will be observed that when the blocking oscillator tube 9 is blocked, this point 36 has a high positive potential. However, when the oscillator tube 9 is keyed into oscillation, the potential at the point 36 is reduced sharply, producing a negative pip which appears on the grid of the switch tube 34. This negative pip is produced at the instant the oscillator tube 9 produces a direct pulse which, as developed above, appears on the grid of the gas tube 31 as a positive pulse. The magnitude of this negative pip is determined by the value of the switch tube grid resistor 39.

Figure 8:
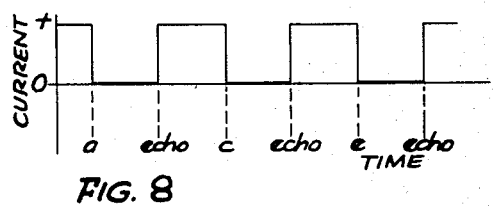

The coupling condenser 38 and the condenser 71 from the point 36 to ground are of such magnitudes that the negative pulse which appears on the grid of the switch tube 34 is longer in duration than the positive pulse appearing on the grid of the gas tube 31. This negative grid pulse does not occur, however, when a reflected pulse is received in the transducer 8. Therefore, whenever a reflected pulse is picked up, the gas tube 31 is fired by the resulting positive pulse appearing on its grid and continues conducting until the oscillator tube 9 produces the next succeeding direct signal, which again causes a negative pulse to appear on the grid of the switch tube 34, cutting off both the switch tube 34 and the gas tube 31. Thus the gas tube 31 is fired substantially at the instant a reflected pulse or echo is received and continues to remain conductive until the next direct pulse signal is produced by the oscillator tube 9. A relatively square-shaped current wave is produced in the gas tube 31, as shown in Fig. 8. Since the gas tube 31 is conductive following the first echo received, there can be no response to second or third echoes due to multiple reflections or any other causes. The circuit responds only to the first echo received after the transmitted pulse. Inasmuch as direct pulses are produced at regular intervals, the period of time the gas tube 31 is non-conducting is a measure of the time that elapses between the production of a direct pulse in the transducer 8 and the reception of a reflected pulse therein. This interval of time is proportional to the depth of the water in which soundings are being made. The remainder of the circuit of Fig. 1 serves to control a meter which indicates directly the depth of the water, as will now be explained.

The voltage drop across the cathode resistor 35 of the gas tube 31 is coupled through a transformer 40 to the grid of an amplifying tube 41.

Figure 9:
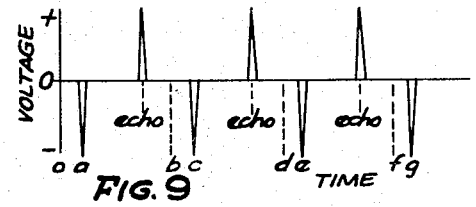

This transformer 40 operates in the same manner as the saw-tooth wave generator transformer 7, providing differentiation pips at the instant when the gas tube 31 is fired and cut off, as shown in Fig. 9. The pips in Fig. 9 are relatively sharp and distinct, due to the square shape of the current wave shown in Fig. 8. Negative pips are produced each time a direct signal is transmitted, which is the time at which the gas tube 31 is cut off, while positive pips are produced each time a reflected pulse or echo is received. The interval between a negative pip and the next succeeding positive pip is proportional to the depth of the water, that is, to the interval of time between transmission of a pulse and reception of its echo.

The negative and positive pips shown in Fig. 9 are impressed on the grid of the amplifier tube 41 together with the negative and positive pips (shown in Fig. 4) produced by the first transformer 7, which are transmitted to the amplifier tube 41 through a conductor 42 and an isolating condenser 72. These two trains of pips are amplified and inverted by the amplifier tube 41. A grid leak resistor 44 provides self-bias. An output transformer 43 couples the output of the amplifier tube 41 to the grid of a "sampling" tube 45, and inverts the pips once again so that there appears on the grid of the sampling tube 45 an amplified series of pips having the relative appearance of those shown in Fig. 10. The centers of the positive pips of Fig. 4 and negative pips of Fig. 9 are separated slightly, for the cut-on potential of the oscillator tube 9 is somewhere up on the sloping leading edge of the positive pip which, it will be recalled, initiates the transmitted pulse which in turn initiates the cut-off of the switch tube 34. This separation has been slightly exaggerated in Fig. 10.

Figure 10:
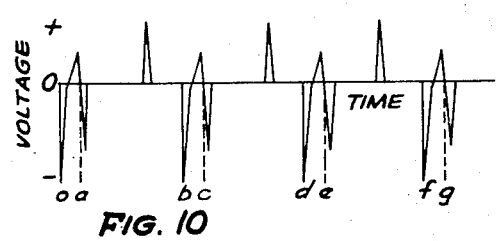
Figure 11:
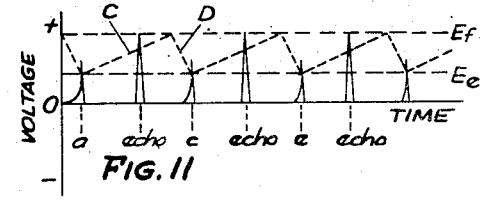

The grid of the sampling tube 45 is biased to cut-off by a bias battery 46 so that the tube operates as a detector, conducting only when positive pips are impressed on its grid. The plate voltage of the sampling tube is provided by the saw-tooth voltage output of the saw-tooth wave generator 1 through a conductor 49. The plate voltage of the tube at any given instant is therefore as represented in Fig. 2. To simplify the explanation of the operation of the tube, Fig. 11 has been redrawn from Fig. 10 showing just the positive pips which render the sampling tube 45 conductive. Superimposed on these positive pips is the saw-tooth shaped plate voltage wave of the tube, indicated in dotted line. It will be observed that a positive pip occurs at times $a$, $c$, and $e$ when the plate voltage is a minimum, corresponding to the time at which a direct pulse is transmitted, and also that a positive pip occurs some time after each of lines $a$, $c$, and $e$, when the plate voltage has built up somewhat, at a time when an echo or reflected pulse is received. During each saw-tooth, therefore, the sampling tube 45 conducts at two intervals, and produces rectified voltages, one a substantially constant voltage in accordance with the extinction plate voltage $E_e$ existing at times $a$, $c$, and $e$, and the other a larger voltage in accordance with the plate voltage existing at the time when an echo is received. The difference between this second voltage and $E_e$ is proportional in magnitude to the length of time required for reception of the echo of the transmitted pulse, or to the depth of the water. Rectified voltages appear across the cathode resistor 47 and cause a parallel-connected condenser 48 to charge to a voltage that is thus proportionally related to the depth of water being measured.

The importance of the time intervals $b$ to $c$, $d$ to $e$, and $f$ to $g$, required to discharge the saw-tooth generator capacitor 2, now becomes apparent. If the positive pulses of Fig. 4 occurred during the time when the time base sweep was at its maximum $b$, $d$, or $f$ rather than at its minimum $a$, $c$, or $e$, the plate voltage on the sampling tube 45 would be $E_t$ during the transmitted pulse, rather than $E_e$. If the discharge time (D in Fig. 2) were practically instantaneous, the plate voltage on the sampling tube 45 would be apt to fluctuate between $E_e$ and $E_t$, so that the "zero" standard voltage would not be definitely determined. In the present invention, however, the "zero" standard voltage is definitely maintained at $E_e$, the minimum time base voltage. To guarantee this, the same positive pulse (Fig. 4) from the sweep generator that gates or triggers the blocking oscillator tube 9 is employed to unblock the sampler tube 45 to obtain the "zero" voltage standard. The time base sweep, transmitted pulse, and "zero" sampler tube voltage level are thus all accurately synchronized. The cathode resistor 5 in the sweep generator circuit aids in providing the time intervals $b$ to $c$, $d$ to $e$, and $f$ to $g$.

The output of the circuit of Fig. 1 may be measured in a vacuum tube voltmeter, like that shown in Fig. 12, comprising two tubes 49 and 50. The voltage to be measured is impressed on the grid of the first tube 49. The two tubes 49 and 50 have their cathodes interconnected through resistors 51 and 52, respectively, and also through a meter 53. A voltage divider comprising two series connected resistors 54 and 55 is used to maintain the bias of the second voltmeter tube 50 at a desired level, such that the two tubes are balanced and no current flows through the meter when only transmitted pulses exist, but no reflected pulses are being received. The reading of the meter is then directly proportional to the voltage developed by the sampling tube 45 upon the receipt of reflected pulses. Since the magnitude of this voltage is directly proportional to the depth of the water, the meter may be calibrated to read the depth of water directly. A condenser 56 serves to filter the voltages applied to the meter so that the meter will not fluctuate unduly and so that several reflected pulses may be missed without affecting the reading.

It will be noted that a voltage regulated supply is preferred for energization of the saw-tooth voltage generator tube 1, for such a supply improves the stability of the circuit. Likewise, in Fig. 12, the vacuum tube voltmeter should be energized from the same kind of a supply for the same reason. The saw-tooth voltage generator can be further stabilized by the employment of a vibrating reed controlling arrangement as shown in Fig. 13. There both coils of the differentiating transformer 7 are wound on the middle leg 60 of a somewhat E-shaped magnetizable core 61. A vibratable reed 62 which should be made of a magnetizable material is mounted on one outside leg 63 of the core 61, and extends over the top of the middle leg 60 toward but not quite to the other outside leg 64. The free end of the reed 62 is provided with a weight 65 which is preferably made of a highly magnetizable material, for example, Alnico, a highly magnetizable alloy of aluminum, cobalt, and nickel. The other outside leg 64 of the core 61 is bent so that the weight 65 can pass by it when the reed oscillates, and has a coil 66 wound on it. This coil 66 is connected between the grid of the saw-tooth generator tube 1 and ground. The remainder of the circuit of Fig. 13 is like that shown in Fig. 1.

The grid circuit coil 66 and its core leg 64 constitute a voltage generator when the reed 62 oscillates and the weight 65 passes by the bent core leg 64, the voltage generated in the coil 66 being a pulse-like alternating voltage, of the kind shown in Fig. 14. The reed 62 and weight 65 have a natural frequency equal to the desired pulse rate, while the relaxation oscillator or saw-tooth generator 1 is free-running at a slightly different frequency. The current pulses (Fig. 3) that pass through the primary of the transformer 7 pulse magnetize the center leg 60 of the core 61 and the reed 62 begins to oscillate. The pulses shown in Fig. 14 are then generated and applied to the grid of the saw-tooth generator tube 1 in such fashion that conductivity of the tube 1 is aided; that is, a positive pip from the grid coil 66 is applied to the grid during conductivity of the tube. When the reed 62 is oscillating fully, at its natural frequency, these positive pips can be made to occur just prior to the natural, free firing of the tube, and to fire the tube, thus locking the repetition frequency of the saw-tooth generator in with the natural frequency of the reed. Similarly, the reed 62 can lock the tube to a frequency slightly less than that at which the tube would oscillate freely.

A simpler form of vibrating reed synchronizing arrangement is shown in Fig. 15. There the grid coil 66 and its core leg are eliminated, and the "Alnico" weight 65 swings by the free end of the remaining core leg 60, being attracted thereto to start the reed 62 oscillating by the same gas tube 1 current pulses that start the reed in Fig. 12. The Alnico bar 65 then induces a voltage in the primary winding of the transformer 7, which voltage is applied to the cathode of the tube 1 in such fashion as to render the cathode more negative than the grid, which may be grounded as in Fig. 1, to start the tube early, or more positive than the grid to retard the firing of the tube.

The transformer 7 and reed 62 of Fig. 15 may be constructed as shown in Fig. 16, where the core leg 60 is bifurcated, having two arms 60A and 60B, respectively. One coil 7A or 7B of the transformer 7 is wound on each arm. The Alnico weight 65 is here preferably in the form of a bar, and as it swings by the free ends of the core arms 60A and 60B, a voltage is induced in the transformer coils 7A and 7B. The coil that is connected to the cathode furnishes its induced voltage thereto.

Many other modifications of the invention will occur to those skilled in the art. For example, second and third echoes may be prevented from occurring along with or close to the first echo by rendering the duration of the sweep or upward-sloping portion C of the saw-tooth wave so long that these higher order echoes will return before another energy pulse is transmitted. This is accomplished by reducing the sweep generator frequency, and hence the pulse rate. These higher order echoes then occur while the gas tube 31 is conductive, and have no effect, as explained above. If desired, separate transmitting and receiving transducers may be used in place of the single transmitting and receiving transducer 8 used in Fig. 1.

The claims that follow are intended to cover these and other modifications and equivalents of the invention and accordingly are to be given a broad interpretation commensurate with the scope of the invention within the art.

Having now described my invention, I claim:

1. In combination, a normally free-running electronic oscillator circuit having a first natural frequency of oscillation, a vibratory reed consisting at least in part of magnetizable material and having a second natural frequency of oscillation which is close to said first frequency, an electromagnet connected in the oscillatory circuit to have the oscillatory current of the free-running oscillator flow therethrough, said reed being fixedly mounted at one end and having an intermediate magnetizable portion disposed adjacent said electromagnet sufficiently close to be set eventually into mechanical oscillation at said second frequency in response to the oscillatory magnetic field of said electromagnet oscillating at said first frequency, a permanent magnet affixed to the free end of said reed, a coil of wire disposed near the vibratory path of said magnet, whereby when said reed vibrates alternating voltage pulses at said second frequency are induced in said coil, and means connecting said coil to said circuit to influence said first frequency.

2. In combination, a normally free-running electronic oscillator circuit having a first natural frequency of oscillation, a vibratory reed consisting at least in part of magnetizable material and having a second natural frequency of oscillation which is close to said first frequency, an electromagnet connected in the oscillatory circuit to have the oscillatory current of the free-running oscillator flow therethrough, said reed being fixedly mounted at one end and having an intermediate magnetizable portion disposed adjacent said electromagnet sufficiently close to be set eventually into mechanical oscillation at said second frequency in response to the oscillatory magnetic field of said electromagnet oscillating at said first frequency, means affixed to the free end of said reed providing a permanent magnetic flux field, said field providing means being movable with said reed, a coil of wire disposed near the path of said field providing means, whereby when said reed vibrates alternating voltage pulses at said second frequency are induced in said coil, and means connecting said coil to said circuit to influence said first frequency.

3. In combination, a normally free-running relaxation oscillator having a first natural frequency of oscillation, a vibratory reed consisting at least in part of magnetizable material and having a second natural frequency of oscillation which is close to said first frequency, an electromagnet connected in the oscillatory circuit to have the relaxation oscillation current pulses flow therethrough, said reed being fixedly mounted at one end and having an intermediate magnetizable portion disposed adjacent said electromagnet sufficiently close to be set eventually into mechanical oscillation at said second frequency in response to the oscillatory magnetic field of said electromagnet oscillating at said first frequency, means affixed to the free end of said reed providing a permanent magnetic flux field, said field providing means being movable with said reed, a coil of wire disposed near the path of said field providing means, whereby when said reed vibrates alternating voltage pulses at said second frequency are induced in said coil, and means connecting said coil to said circuit to influence said first frequency.

4. In a combination, a normally free-running relaxation oscillator including an electron tube with anode, cathode, and control grid electrodes, and having a first natural frequency of oscillation, a vibratory reed consisting at least in part of magnetizable material and having a second natural frequency of oscillation which is close to said first frequency, an electromagnet connected in the anode-cathode circuit of said tube, said reed being fixedly mounted at one end and having an intermediate magnetizable portion disposed adjacent said electromagnet sufficiently close to be set eventually into mechanical oscillation at said second frequency in response to the oscillatory magnetic field of said electromagnet oscillating at said first frequency, means affixed to the free end of said reed providing a permanent magnetic flux field, said field providing means being movable with said reed, a coil of wire disposed near the path of said field providing means, whereby when said reed vibrates alternating voltage pulses at said second frequency are induced in said coil, and means connecting said coil in the grid-cathode circuit of said tube with the polarity of said pulses arranged to cause said relaxation oscillations to occur at said second frequency.

5. In combination, a normally free-running relaxation oscillator including an electron tube with anode, cathode, and control grid electrodes, and having a first natural frequency of oscillation, a vibratory reed consisting at least in part of magnetizable material and having a second natural frequency of oscillation which is greater than said first frequency, an electromagnet connected in the anode-cathode circuit of said tube, said reed being disposed adjacent said electromagnet whereby one or more pulses of the relaxation oscillation current cause said reed to oscillate, means affixed to said reed providing a permanent magnetic flux field, said field providing means being movable with said reed, a coil of wire disposed near the patth of said field providing means, whereby when said reed vibrates alternating voltage pulses at said second frequency are induced in said coil, and means connecting said coil in the grid-cathode circuit of said tube with the polarity of said pulses arranged to cause said tube to become conductive earlier in each oscillation cycle, whereby said relaxation oscillations occur substantially at said second frequency.

6. In combination, a normally free-running relaxation oscillator including an electron tube with anode, cathode, and control grid electrodes, and having a first natural frequency of oscillation, a vibratory reed consisting at least in part of magnetizable material and having a second natural frequency of oscillation which is less than said first frequency, an electromagnet connected in the anode-cathode circuit of said tube, said reed being disposed adjacent said electromagnet whereby one or more pulses of the relaxation oscillation current cause said reed to oscillate, means affixed to said reed providing a permanent magnetic flux field, said field providing means being movable with said reed, a coil of wire disposed near the path of said field providing means, whereby when said reed vibrates alternating voltage pulses at said second frequency are induced in said coil, and means connecting said coil in the grid-cathode circuit of said tube with the polarity of said pulses arranged to cause said tube to become conductive later in each oscillation cycle, whereby said relaxation oscillations occur substantially at said second frequency.

ROBERT A. FRYKLUND.

REFERENCES CITED

The following references are of record in the file of this patent:

UNITED STATES PATENTS

| Number | Name | Date |
|---|---|---|
| 2,151,021 | Frohman | Mar. 21, 1939 |
| 2,174,296 | Wallace | Sept. 26, 1939 |
| 2,260,847 | Warren | Oct. 28, 1941 |
| 2,428,799 | Hayes et al. | Oct. 14, 1947 |